United States Patent [19]

Barbagli

[11] Patent Number: 4,552,031

[45] Date of Patent: Nov. 12, 1985

[54] DEVICE FOR CONTROLLING THE TRAVEL OF A VEHICLE

[75] Inventor: Rino O. Barbagli, Borgaretto, Italy

[73] Assignee: Fiatallis Europe S.p.A., Torino, Italy

[21] Appl. No.: 488,413

[22] Filed: Apr. 25, 1983

[30] Foreign Application Priority Data

May 3, 1982 [IT] Italy ............................... 67579 A/82

[51] Int. Cl.$^4$ ........................... G05G 5/04; G05G 7/00
[52] U.S. Cl. .................................... 74/473 R; 74/476; 74/491; 74/526
[58] Field of Search ..................... 74/473 R, 476, 491, 74/526

[56] References Cited

U.S. PATENT DOCUMENTS

| 2,477,589 | 8/1949 | Du Shane | 74/526 |
| 4,137,792 | 2/1979 | Cellano | 74/476 X |
| 4,228,879 | 10/1980 | Woodburry | 74/475 X |
| 4,267,745 | 5/1981 | Edwards | 74/526 X |

FOREIGN PATENT DOCUMENTS 697437 10/1940 Fed. Rep. of Germany ........ 74/526

Primary Examiner—Allan D. Herrmann

Attorney, Agent, or Firm—August E. Roehrig, Jr.

[57] ABSTRACT

A transmission shifting apparatus for controlling the speed and direction of movement of a vehicle. The transmission shifting apparatus utilizes an operating shift lever movable in a first direction through a plurality of successive positions in each of which it controls the forward movement of the vehicle at a predetermined speed, and a second opposed direction through a plurality of successive positions in each of which it controls the reverse travel of the vehicle at predetermined speeds. The shift lever is movable in a transverse direction between the first and second paths of movement to define a neutral or idle position in which no motion is imparted to the vehicle through the transmission. Movement of the transmission shift lever through the neutral position effects engagement of limit stops to retain the shift lever in the idle or neutral position. A bypass system is provided to disengage the shift lever from the limit stops by a predetermined movement of the shift lever against a biasing force which enables the shift lever to pass directly between the first and second directional controlling paths of movement bypassing the idle or neutral locking position.

6 Claims, 6 Drawing Figures

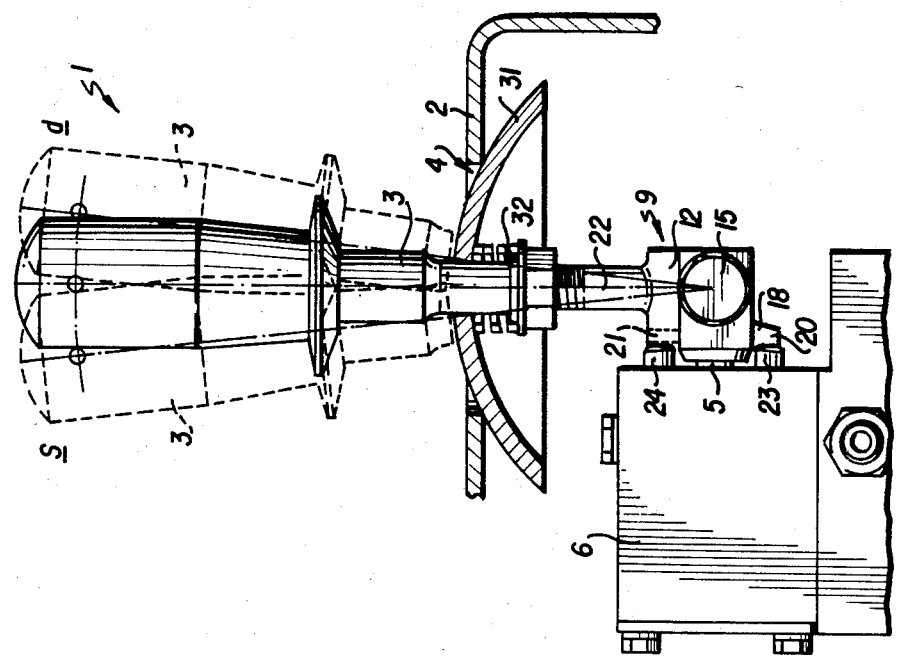
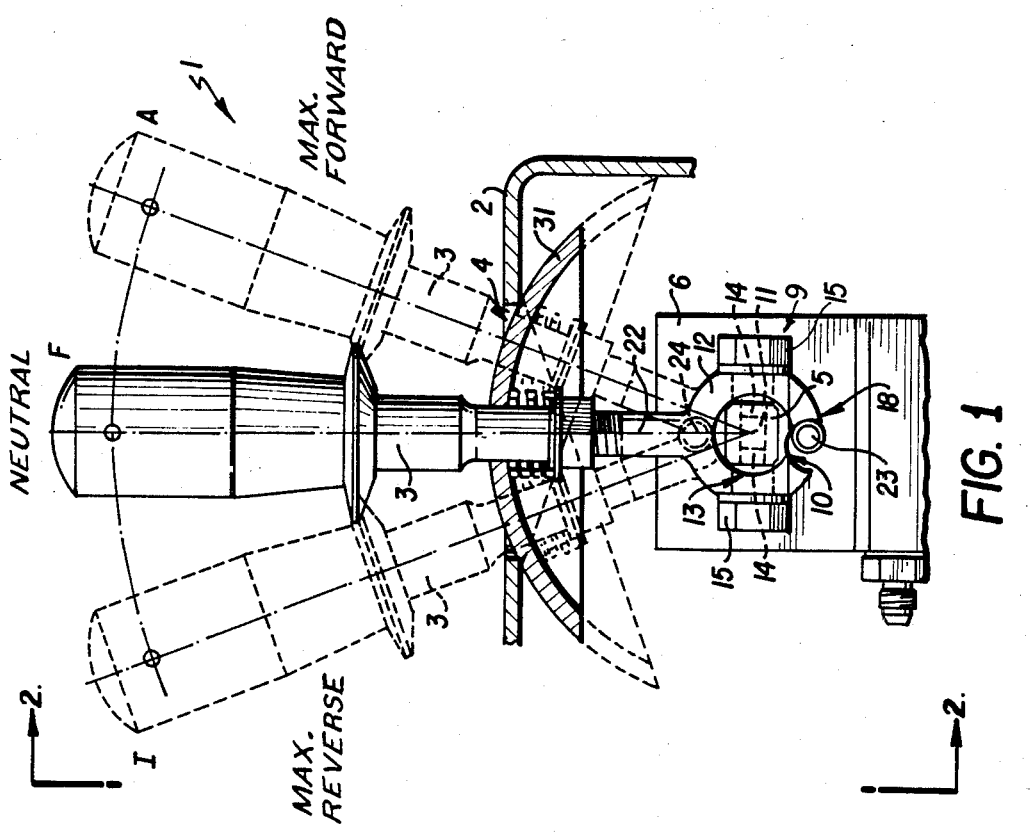

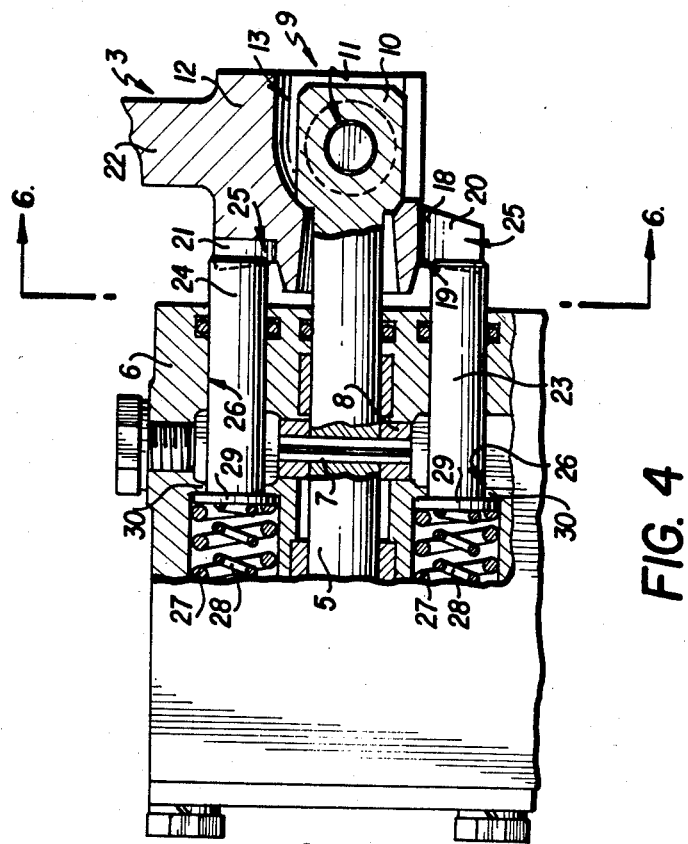
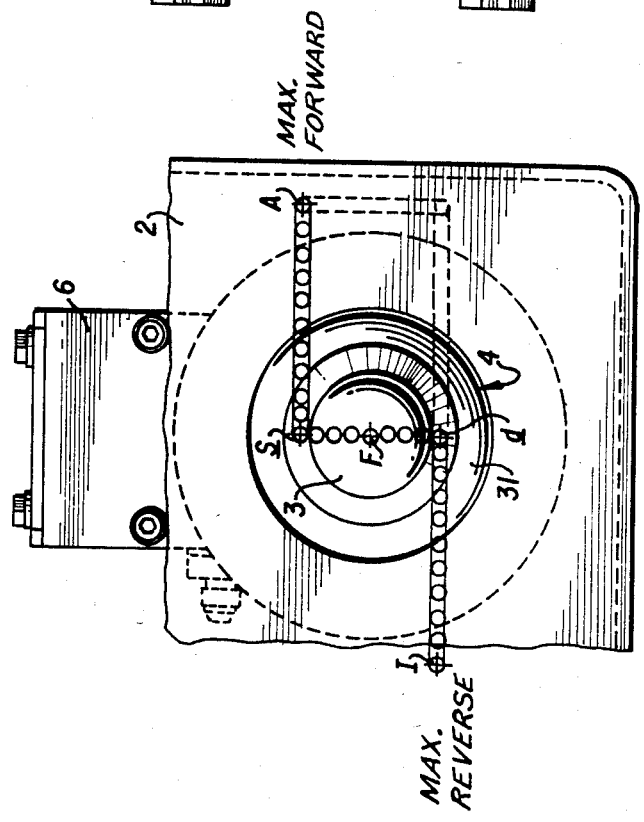
FIG. 4
FIG. 3

DEVICE FOR CONTROLLING THE TRAVEL OF A VEHICLE

BACKGROUND OF THE INVENTION

This invention relates in general to shifting mechanisms for controlling the movement of a vehicle and, in particular, to a unilever system for controlling the speed and directional movement of a vehicle such as an earthmoving machine.

More specifically, but without restriction to the particular use which is shown and described, this invention relates to a unilever control for a hydrostatic transmission of an earthmoving machine for controlling speed of movement in a forward or reverse direction.

Earthmoving machines frequently utilize a hydrostatic transmission which is controlled by the machine operator through a control mechanism including a hydraulic pilot device which operates control valves for various pumps and fluid motors used in the hydraulic transmission circuit. Generally such transmission control mechanisms include a shift lever movable through a predetermined path of movement referred to as a Z-shifting pattern to shift between ranges in one direction of movement, e.g. forward, and ranges of movement in an opposed direction, e.g. reverse. Certain transmission control constructions, such as disclosed in U.S. Pat. No. 4,228,879, utilize a guide plate containing a shift pattern cutout in which the transmission lever is movable in a predetermined pattern. Such guide plates include stop cutouts requiring predetermined positioning of the shift lever in a particular manner when shifting the transmission. These cutouts constrain the shift lever for movement in one direction into a first plurality of positions in which it controls the forward travel of the vehicle, and in an opposite direction into a second plurality of positions in which it controls the reverse travel of the vehicle. Between the forward travel and reverse travel positions, the transmission shift lever is placed in an idle or neutral position in which the transmission is disengaged and, thereby, the vehicle is not driven.

In order to precisely identify the idle or neutral position, the transmission shift lever is required to be moved laterally to the direction of its speed controlling operation, in order to pass between the first and the second plurality of operating positions. In such constructions, this neutral or idle position is identified by a transversely extending slot against which the transmission lever will be engaged to halt the lever's movement in its speed controlling directional operation. Therefore, the machine operator must move the transmission shift lever to follow a path of movement which is defined by the profile of the shift pattern cutout, and which comprises a first linear portion along which the shift lever is moved to engage the first plurality of positions, and a second parallel linear portion, offset from the first, which extends in an opposed direction through which the transmission lever is moved to engage the second plurality of positions. The offset portions between the first and second parallel portions is joined by the transverse portion which defines the neutral or idle station.

In transmission control systems utilizing a shift pattern cutout, in order to shift between speed ranges in a forward direction and speed ranges in a reverse direction, there is no way in which the shifting pattern may be modified. Therefore, if it beoomes necessary to immediately reverse the direction of movement of the vehicle in an emergency, the machine operator must retrace the initial path of movement and pass through the idle or neutral position before being able to reverse the direction of the machine. This retracing operation is further hindered by the presence of the limit stops formed by the slot edges which require the machine operator to follow the Z-shape shift pattern cutout with three separate movements of the lever in different directions. The present invention provides a mechanism whereby in normal oepration a Z-shift pattern is maintained, but can be overridden by the vehicle operator in an emergency situation to shift directly between forward and reverse.

SUMMARY OF THE INVENTION

It is, therefore, an object of this invention to improve shifting devices for vehicle transmissions.

Another object of this invention is to permit a vehicle operator to override a Z-shifting pattern in an emergency situation.

A further objection of this invention is to control the movement of a transmission shift lever in a Z-shifting pattern without the use of a shift pattern cutout.

These and other objects are attained in accordance with the present invention wherein there is provided a transmission shifting apparatus for controlling the speed and direction of movement of a vehicle. The transmission shifting apparatus utilizes an operating shift lever movable in a first direction through a plurality of successive positions in each of which it controls the forward movement of the vehicle at a predetermined speed, and a second opposed direction through a plurality of successive positions in each of which it controls the reverse travel of the vehicle at predetermined speeds. The shift lever is movable in a transverse direction between the first and second paths of movement to define a neutral or idle position in which no motion is imparted to the vehicle through the transmission. Movement of the transmission shift lever through the neutral position effects engagement of limit stops to retain the shift lever in the idle or neutral position. A by-pass system is provided to disengage the shift lever from the limit stops by a predetermined movement of the shift lever against a biasing force which enables the shift lever to pass directly between the first and second directional controlling paths of movement bypassing the idle or neutral locking position.

DESCRIPTION OF THE DRAWINGS

Further objects of the invention, together with additional features contributing thereto and advantages accruing therefrom will be apparent from the following description of a preferred embodiment of the invention, which is shown in the accompanying drawings with like reference numerals indicating corresponding parts throughout, wherein:

FIG. 1 is a side view of a shifting lever mechanism constructed in accordance with the present invention and used for controlling the travel of a vehicle;

FIG. 2 is a transverse view of the device shown in FIG. 1, taken in the direction of lines 2—2;

FIG. 3 is a top planar view of the apparatus shown in FIG. 1;

FIG. 4 is a partial sectional view of a portion of the apparatus as shown in FIG. 2 in an enlarged scale;

DESCRIPTION OF A PREFERRED EMBODIMENT

Figure 6:
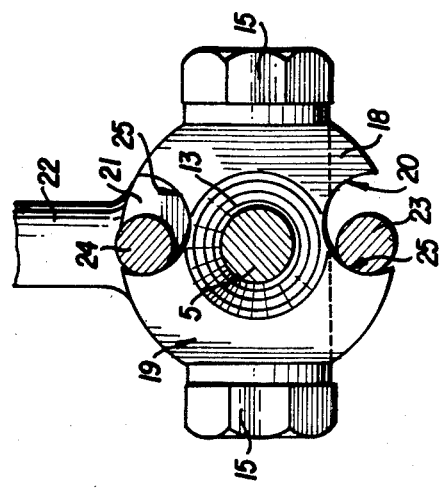
FIG. 6 is an enlarged sectional view of a portion of the apparatus shown in FIG. 4 taken along lines 6—6.

Referring now to FIGS. 1 and 2, there is shown a shift lever mechanism 1, which is used in controlling the travel of a vehicle (not shown), and in particular for controlling a hydrostatic transmission of an earthmoving machine.

The shift lever apparatus 1 is carried on the dashboard 2 of the vehicle, and includes an operating or shift lever 3 which projects from the dashboard 2 through a circular hole 4 in a position to be operated manually by the vehicle operator in order to control the vehicle movement.

In order to prevent dirt and/or debris from entering into the shift lever mechanism, and to minimize noise transmission into the operator's compartment, the hole 4 is closed by a spherical cap 31 carried by the shift lever 3. The spherical cap 31 is held against the edge of the dashboard 2 by a coil spring 32, concentrically mounted about a portion of the shift lever 3. One end of the spring 32 engages an adjustable stop mounted on the shift lever 3, and the opposite spring end provides an outwardly directed force against the inner side of the spherical cap 31 to maintain a certain friction between the dashboard 2 and the spherical cap 31 which also holds the shift lever 3 in position.

The shift lever 3 is fixedly secured to a control shaft 5 with the shift lever 3 extending radially outwardly therefrom in a direction substantially perpendicular or normal to the longitudinal axis of the control shaft 5. The shift lever 3 can be oscillated about the longitudinal axis of the control shaft 5, between two opposite equidistant end positions A and I indicated by the dashed lines in FIG. 1. Equidistant between the two end positions A and I is an intermediate position F, indicated by the full lines in FIG. 1, which corresponds to an idle or neutral position for a purpose to be hereinafter described in greater detail.

The shift lever 3 can be moved to any position between the intermediate position F, and either of the equidistant end positions A or I and, in particular, is movable between a first plurality of successively aligned positions lying beteen the positions A and F (in which it controls the forward travel of the vehicle), and a second plurality of sucessively aligned positions lying between the positions I and F (in which it controls the reverse travel of the vehicle) as illustrated by the solid lines of the Z-shifting pattern shown in FIG. 3. Therefore, the positioning of the shift lever 3 not only controls the direction of vehicle movement, but also determines the speed of movement of the vehicle, which increases as the shift lever 3 is moved forward either of the end positions, A or I, corresponding to maximum forward or reverse speed, respectively. Position F corresponds to an idle or neutral position, and with the shift lever 3 in this position the vehicle remains stationary.

As is known to those skilled in the art, the shift lever 3 is coupled to a transducer of any known type (not shown), contained in a housing 6 from which the control shaft 5 projects. The transducer is operatively connected to the control shaft 5 to effect operation of the vehicle in accordance with the movement of the shift lever 3. Since the shift lever 3 is fixedly connected to the control shaft 5, rotation or oscillation of shift lever 3 correspondingly moves the control shaft 5 and, thereby, the operation of the transducer which acts through suitable hydraulic, electrical, and/or mechanical controls of the vehicle in order to establish and maintain the vehicle direction of travel and speed.

In the case of a hydraulic transmission, a collar 8 (best shown in FIG. 4), is fixed onto the control shaft 5 by a resilient pin 7, and is provided with a rocker lever (not shown) which acts on two hydraulic regulating valves (not shown) which control the forward and reverse travel of the vehicle. When the shift lever 3 is in the neutral or idle position F, both of these hydraulic regulating valves are closed and consequently the vehicle is at rest. When the shift lever 3 is moved toward position A, one of the valves progressively opens and controls the forward travel speed of the vehicle, while upon moving the shift lever 3 toward position I, the other valve is progressively opened which controls the reverse travel speed of the vehicle.

The shift lever 3 is connected to the control shaft 5 by a joint 9 which enables the shift lever 3 to be moved in a lateral direction transversely to the plane in which the shift lever moves to effect a change of the vehicle's speed and direction, for a purpose to h=hereinafter discussed in detail. Through this connection, the shift lever 3 may be moved into an angulated position relative to the axis of the control shaft 5, into either of two symmetrical and oppositely disposed oblique positions which are illustrated in FIG. 2 by the dashed lines designated by the letters d and s. The formation of the joint 9 in this manner will permit the machine operator to shift directly between forward and reverse bypassing the neutral or idle position in an emergency situation, to be explained in more detail hereinafter.

Figure 5:
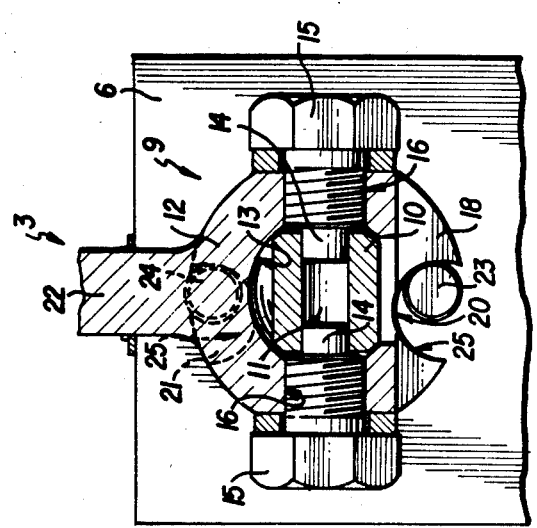
FIG. 5 is a partial sectional view of the apparatus illustrated in FIG. 1 on an enlarged scale.

To this end, referring to FIG. 5, the joint 9 is formed in cooperation with a distal end 10 of the control shaft 5, having a bore 11 extending transversely to the longitudinal center line of the control shaft 5, and a lower end 12 of the shift lever 3. The lower end 12 is provided with an enlarged central bore 13, housing the end 10 of the control shaft 5, and sufficiently larger to allow a certain degree of relative movement between the lower end 12 of the shift lever 3, and the distal end of the control shaft 5. The shift lever 3 is fixed to the control shaft 5 by a pair of pins 14, which engage the bore 11 and are formed as stepped portions of two screws 15, which threadingly engage the lower end 12 of the shift lever 3 through a pair of transverse bores 16 formed therein co-axial with the bore 11.

The lower ends 12 of the gear shift lever 3, is provided with a motion control plate 18 (FIG. 6) rigidly connected with the shift lever 3, and positioned with its center concentric with the longitudinal axis of the control shaft 5. The motion control plate 18 is formed with a flat cam surface 19 facing the housing 6, in which is formed two symmetrical radial detents or cavities 20 and 21. The detents or cavities 20 and 21 are formed in the flat surface 19 in opposite positions relative to the longitudinal axis of the control shaft 5, and function to limit the oscillatory movement of the shift lever 3.

More specifically, the motion-limiting cavity 20 is formed as a circular cross-section positioned with its center parallel to the longitudinal axis of control shaft 5, with the outer edges 25 defining the circular cross-section cavity. The cavity 21 is similarly constituted by a circular recess defined by edges 25 and provided in a symmetrical position at the periphery of the disk 18 adjacent to a shank portion 22 of the shift lever 3.

The motion-limiting cavities 20 and 21 are arranged for engagement by the distal end of two spring-loaded stop pins, 23 and 24, which are carried in a position such that their longitudinal axes are parallel to the longitudinal axis of the control shaft 5. As best shown in FIG. 4, the stop pins are disposed on opposite sides thereof, so that they extend from the housing 6 toward the flat cam surface 19 of the motion control disk 18.

The motion-limiting cavities 20 and 21 are arranged such that when the shift lever 3 is disposed in the neutral or idle position F, the stop pins 23 and 24 will be extended within the motion-limiting cavities 20 and 21 against the side wall 25 which defines the cavities to hold the shift lever in the neutral position. The stop pins 23 and 24 are of a length such that they both will extend into the cavity 20 and 21, when the shift lever 3 is in the neutral or idle position F. When this occurs, the shift lever 3 will be positioned perpendicular to the longitudinal axis of the control shaft 5 in the manner shown by the solid lines of FIG. 2. However, when the shift lever 3 is inclined obliquely, for example, into positions d, the stop pin 24 will be disengaged from the detent or cavity 21, whereas the stop pin 23 will become more deeply engaged in the motion-defining cavity 20. This will permit oscillatory movement of the shift lever 3 to the extent defined by the movement of the cavity 20 relative to the pind 23 (FIG. 6).

In contrast, if the shift lever 3 is moved obliquely into position s, the stop pin 23 will become disengaged from motion-limiting cavity 20, and the stop pin 24 will correspondingly become more deeply engaged in the motion-limiting cavity 21. This will permit oscillatory movement of the shift lever 3 to the extent defined by cavity 21. Because of the position of the motion-limiting cavities 20 and 21, formed in the disk 18 in predetermined positions relative to the position of the stop pins 23 and 24, when the shift lever 5 is perpendicular to the longitudinal axis of the control shaft 5 (in the manner shown in solid lines in FIG. 2), both of the stop pins 23 and 24 will engage the motion-limiting cavities 20 and 21 at points in contact with the side wall 25 which prevents movement of the shift lever 3.

However, when the shift lever 3 is moved out from neutral F into position d, the shift lever 3 will be held in that orientation by stop pin 24, and the stop pin 23 will be engaged in the motion-limiting cavity 20 such that the shift lever can only be oscillated between positions F and I. When the shift lever 3 is inclined into position s, the shift lever 3 will be held in that orientation by stop pin 23, and stop pin 24 will be maintained engaged in the motion-limiting cavity 21, so that the shift lever 3 can only be oscillated between positions F and position A. Therefore, the shift lever 3 is compelled to move between the plurality of positions along a path of movement which when viewed in plan (FIG. 3), is of a Z-shape, comprising a first straight portion between positions A and F, and a second straight portion parallel to the first straight portion, between positions F and I, and a portion therebetween, which extends transversely between the first and second straight portions passing through the neutral or idle position F.

The stop pins 23 and 24, which control the orientation of the shift lever in the s, perpendicular or d position, and allow the vehicle operator to bypass the neutral position F, are carried by bores 26, provided in the housing 6. The stop pins 23 and 24 are slidably supported therein, and biased outwardly therefrom by a pair of helical compression springs 27 and 28, contained within an enlarged portion of the bore formed in the housing 6. The springs 27 and 28 bias the stop pins 23 and 24 into a position extending outwardly from bores 26, by biasing an enlarged end 29 of each stop pin 23 and 24 against a shoulder 30 of each bore 26 with a force predetermined by the spring rate of the helical springs. The outer free ends of the stop pins 23 and 24 are held inwardly against the bias of springs 27 and 28 by the flat cam surface 19 of the motion control disk 18, which hold the stop pins in a retracted position in their respective bores 26 by compressing the springs 27 and 28.

In operation, when the shift lever 3 is in the idle or neutral position F, both of the stop pins 23 and 24 extend outwardly into their respective motion-limiting cavities 20 and 21 by the action of the helical compression springs 27 and 28 biasing the stop pins 23 and 24 out from their bores 26. When it is desired to move the vehicle forwardly, the shift lever is oriented into position s, which moves the stop pin 23 out from engagement with the motion-limiting cavity 20, and allows the shift lever 3 to be moved toward position A for moving the vehicle forwardly in accordance with the successive positions defined between the neutral position F and the maximum forward speed position A. When the shift lever 3 is moved from the neutral position F toward the maximum forward speed position A, the biasing force of the compression springs 27 and 28 will extend the stop pin 23 outwardly from the bore 26 against the cam surface 19 to hold the shift lever 3 in the s position permitting the shift lever 3 to be moved through the extent of motion defined by the limits of the motion-limiting cavity 21 controlling the forward speed. When the shift lever 3 is returned to the neutral position, the stop pin 23 will once again engage the motion-limiting cavity 20 at the same time that the stop pin 24 is engaged within motion-limiting cavity 21, thereby locking the shift lever 3 in a perpendicular position prohibiting further movement until such time as the shift lever is once again oriented into either position s or d.

When it is desired to move the vehicle in a reverse direction, the shift lever 3 is oriented into position d, moving stop pin 24 out from engagement with the motion-limiting cavity 21. Upon the movement of the shift lever from the neutral position F toward the maximum reversing position I, the spring bias on the stop pin 24 will force the end thereof outwardly from bore 26 into engagement with the flat cam surface 19 on the motion-controlled disk 18, thereby holding the shift lever 3 in orientation d, and limiting the oscillatory motion thereof by the limits of the motion-limiting cavity 20.

As can be seen from the foregoing description, the action of the spring-biased stop pins 23 and 24 in engaging the motion-defining cavities 20 and 21 compels the machine operator to move the shift lever 3 along a Z-shaped trajectory as illustrated in FIG. 3, exactly as if the shift lever 3 was constrained within a Z-shaped shift pattern cutout formed in the dashboard, while providing a stop lock on the shift lever 3 at the neutral or idle position F. If emergency maneuvering is required, the present invention permits the vehicle operator to move the shift lever 3 directly from forward to reverse travel, and vice-versa, by means of a rectilinear movement eliminating the stoppage in the neutral or idle position F.

For example, assuming that the shift lever 3 is in the maximum forward position A, and thereby inclined into the position s by the spring-biased stop pin 23 acting against the flat cam portion 19 of the motion control disk 18, it is possible to suddenly reverse the direction of vehicle travel without stopping in the idle or neutral position F. To do so the machine operator must move the shift lever 3 sideways from position s to position d, before pulling the shift lever 3 in the reversing direction to apply reversing power to the vehicle. In doing this, the machine operator must overcome the he spring bias force applied to the shift lever 3 by the stop pin 23, pushing the stop pin 23 back into its bore 26, which simultaneously disengages stop pin 24 from the confines of motion-limiting cavity 25.

As the shift lever 3 is pulled toward the maximum reversing speed I, to drive the vehicle in a reverse direction, because the length of the stop pin 24 is insufficient to extend within the motion-limiting cavity 21 when the shift lever 3 is in orientation d, the stop pin 24 will be unable to engage the side wall 25 for stopping the shift lever 3 in the idle or neutral position F. As the shift lever 3 passes into the reversing direction, upon passing beyond the idle or neutral point F, the oscillatory movement of the gear shift lever 3 will move the motion control disk 18 such that stop pin 23, which heretofore had been held in a retracted position by the flat cam surface 19, will upon passing beyond the neutral or idle point F be extended by the spring biasing force into the motion-limiting cavity 20. During this action the shift lever 3 will have moved along a substantially rectilinear or somewhat L-shaped path shown by the dotted line in FIG. 3.

The action of the vehicle operator in overcoming the spring force of the compression springs 27 and 28, which will be required until the shift lever 3 has passed through the neutral position F, is intended to be of sufficient magnitude as to be used only in an emergency situation. If at any time the machine operator does not keep the shift lever 3 displaced sideways during the emergency maneuver, the spring biasing force of the compression springs 27 and 28 will urge the stop pins to return the shift lever 3 into its normal position corresponding to the direction of travel in which the vehicle was maneuvering prior to the emergency situation arising. While for convenience of illustration, an emergency situation was described going from a forward direction into reverse, if the emergency situation had arisen while the vehicle was being operated in a reverse direction, the same procedure would be followed by the vehicle operator except the gear shift lever 3 would have been moved to position s, against the biasing force of the compression springs 27 and 28 associated with stop pin 24, to go directly from a reverse direction into a forward direction in an emergency situation.

As can be seen from the foregoing description an advantage of the present situation provides a control device wherein during normal operation the shift lever 3 is subject to a Z-shaped shift pattern, which can be modified in an emergency with a rapid movement without halting in the neutral or idle position. Therefore all of the advantages of a control device which requires a Z-path may be utilized without the drawbacks previously encountered. While the invention has been described with reference to a preferred embodiment, it will be understood by those skilled in the art that various changes may be made and equivalents may be substituted for elements thereof without departing from the scope of the invention. In addition many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A transmission shifting mechanism for controlling the operation of a vehicle transmission operable through rotational movement of a control shaft by corresponding rotational movement of a shift lever in a predetermined path of movement between forward and reverse vehicle motion-defining directions, including a neutral holding position during normal operation of the vehicle, and adapted to be shifted directly between the forward and reverse vehicle motion-defining directions bypassing the neutral stop position in an emergency upon overcoming a biasing force urging the shift lever to move in the predetermined path of movement, the shifting mechanism comprising a shift lever operatively connected to a control shaft for effecting movement of a vehicle in accordance with the positioning of the control shaft in response to the movement of said shift lever, said shift lever having a hub portion connected to said control shaft for effecting rotational movement of said control shaft in response to rotational movement of said shift lever and effecting pivotal movement of said shift lever relative to said control shaft, said hub portion having formed therein first and second motion-limiting means for limiting the rotational movement of said shift lever, first and second stop means mutually exclusively positioned adjacent said first and second motion-limiting means and extendable into engagement therewith to stop the rotational movement of said shift lever upon engagement of both of said stop means with both of said motion-limiting means, said first and second stop means being mutually exclusively released from engagement with said motion-limiting means upon pivotal movement of said shift lever relative to said control shaft thereby allowing rotational movement of said shift lever within the limits defined by the engagement of one of said stop means engaging one of said motion-limiting means.

2. The transmission shifting mechanism defined by claim 1 wherein said shift lever hub includes a flat planar surface having a pair of detent cavities formed therein which define said first and second motion-limiting means, and said first and second stop means each includes a stop pin positioned parallel to said control shaft and disposed in a position such that an end thereof is extendable into engagement with one of said detent cavities to be engaged thereby for limiting the rotational movement of said shift lever.

3. The transmission shifting mechanism defined by claim 2 wherein each of said stop pins are positioned parallel to and on opposite sides of the longitudinal axis of said control shaft and supported with the longitudinal axis thereof parallel to the longitudinal axis of said control shaft.

4. The transmission shifting mechanism defined by claim 3 wherein each of said stop pins is resiliently biased into contact with said flat planar surface of said shift lever hub and is positionable into engagement with one of said detent cavities formed in said shift lever hub upon the positioning of said shift lever hub to position said detent cavities in alignment with an end of said stop pins.

5. The transmission shifting mechanism defined by claim 4 wherein said detent cavities formed in said flat planar surface of said shift lever hub are formed therein in substantially diametrically opposed positions such that the simultaneous engagement of said stop pins in said detent cavities locks said shift lever against rotational movement thereof until said shift lever is pivoted relative to said control shaft to move one of said stop pins out from engagement with one of said detent cavities.

6. The transmission shifting mechanism defined by claim 5 wherein each of said resiliently biased stop pins includes a compression spring carried concentrically about said stop pin and having one end applying a force against said stop pin extending said pin outwardly against said flat planar surface of said shift lever hub.

* * * * *